Nov. 4, 1952  F. L. VAN WEENEN  2,616,245
DOUBLE-ACTING HOT GAS ENGINE HAVING AT LEAST
THREE CLOSED THERMODYNAMIC CYCLES
Filed Oct. 7, 1949

INVENTOR.
FRANCISCUS LAMBERTUS VAN WEENEN
BY Fred M. Vogel
AGENT

Patented Nov. 4, 1952

2,616,245

UNITED STATES PATENT OFFICE 2,616,245

DOUBLE-ACTING HOT GAS ENGINE HAVING AT LEAST THREE CLOSED THERMODYNAMIC CYCLES

Franciscus Lambertus van Weenen, Eindhoven, Netherlands, assignor to Hartford National Bank and Trust Company, Hartford, Conn., as trustee Application October 7, 1949, Serial No. 120,046
In the Netherlands October 12, 1948

3 Claims. (Cl. 60—24)

This invention relates to double acting hot-gas reciprocating engines in which at least three closed thermodynamic cycles are adapted to be performed.

According to the invention, a double acting hot-gas reciprocating engine in which at least three closed thermodynamic cycles are adapted to be performed is characterized in that it comprises two groups of cylinders and each of at least two cycles takes place in a chamber of one group of cylinders and in a chamber of the other group, the pistons of each group of cylinders actuating a common crank of a crank shaft provided separately for each group, and the crank shafts jointly transmitting the power given off to them to a main shaft through a transmission.

The invention provides a hot-gas engine, so constructed as to permit the cylinder groups to be arranged in several different ways. This may, for example, be advantageous in relation to the available space. Thus, for example, two cylinders of a group may be arranged one in front of the other, side by side, or one above the other in accordance with the available space. This construction has the additional advantage that the engine may consist of two substantially similar units having, for example, exactly similar crank shafts of simple shape.

The crank shaft for one group of cylinders may be in alignment with the crank shaft for the other group of cylinders. This permits the driven shaft to be provided between the cylinder groups, which yields a compact construction and permits the junction ducts between the two groups of cylinders to be of equal length.

With the use of a hot-gas engine in vessels or for traction purposes, it is very advantageous that the direction of rotation of the main shaft to be driven is reversible without changing the direction of rotation of the crank shafts of the engine. This is readily possible with the hot-gas reciprocating engine according to the invention.

In one embodiment of the invention, one gear wheel secured to each crank shaft co-operates with one gear wheel of a set of two gear wheels secured to the main shaft to be driven in a manner such that upon co-operation of the gear wheels secured to the crank shafts with one of the gear wheels of the set, the driven shaft is actuated in one direction and, upon co-operation with the other gear wheel of the set, the driven shaft is actuated in the other direction. These gear wheels may, for example, be bevel gear wheels or consist of two crown wheels with two associated gear wheels. In the present case the term "co-operation" is to be understood to mean that the gear wheels mesh with one another in a manner such as to transmit a moment from the driving shaft to the shaft to be driven. Thus, the gear wheels may engage each other continuously, the moment being transmitted through a coupling. Alternatively, the gear wheels may mesh alternately. If the two groups of cylinders are arranged side by side such that the crank shafts are parallel to one another, two gear wheels secured to the main shaft are generally required to co-operate with the gear wheel of each crank shaft. If the two groups of cylinders are arranged in a manner such that the crank shafts are in alignment, the advantage is obtained that only two gear wheels on the main shaft to be driven are sufficient.

In order that the invention may be more fully understood and readily carried into effect, it will now be described more fully with reference to the accompanying drawing, in which one embodiment of the hot-gas reciprocating engine according to the invention is represented diagrammatically. In this embodiment of the invention the crank shafts are in alignment.

Figure 1:
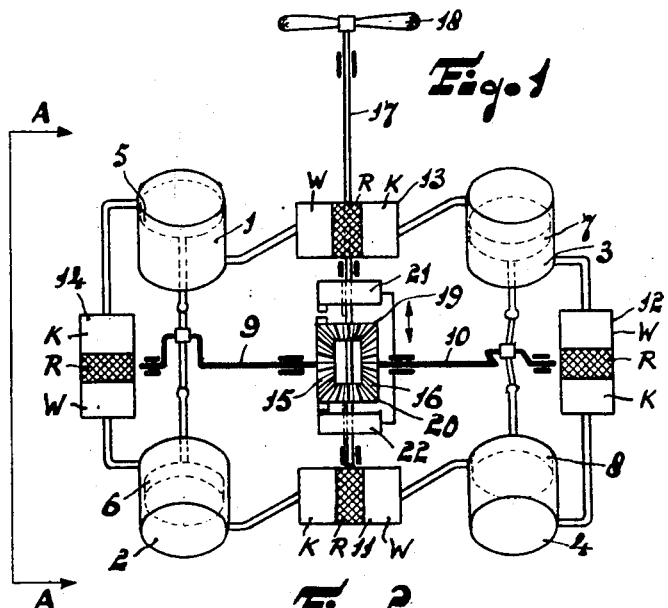
Fig. 1 is a plan view of the engine.
Figure 2:
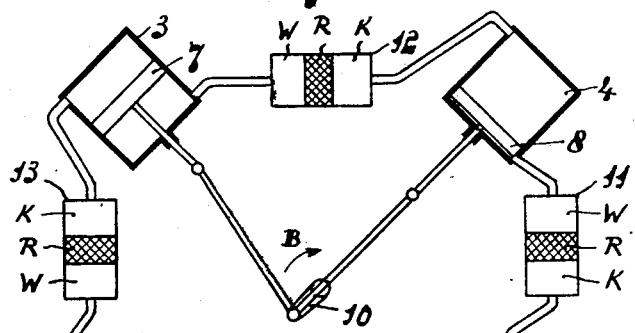
Fig. 2 is a side view, according to the arrows AA in Fig. 1, of the cylinders, the crank and the connecting rod mechanisms.

In Figs. 1 and 2, the cylinders 1, 2 and the cylinders 3, 4 are arranged at an angle of 90°. The pistons 5, 6, 7, 8 move in the cylinders 1, 2, 3 and 4 respectively.

The pistons 5, 6 and 7, 8 actuate the crank shafts 9 and 10 respectively through connecting rods. In the arrangement shown in the drawing it is necessary for the operation of the engine that the crank shafts 9, 10 move in opposite directions, as indicated by the arrows B and C (Fig. 2).

In a suitable arrangement of the cylinders and the piston connecting rod mechanisms the construction of the two parts of the engine, each comprising one group of cylinders, may be exactly similar.

The cylinder chambers are interconnected through heater-, regenerator- and cooler-units 11, 12, 13 and 14. In each unit the heater is designated W, the regenerator R and the cooler K.

Figure 3:
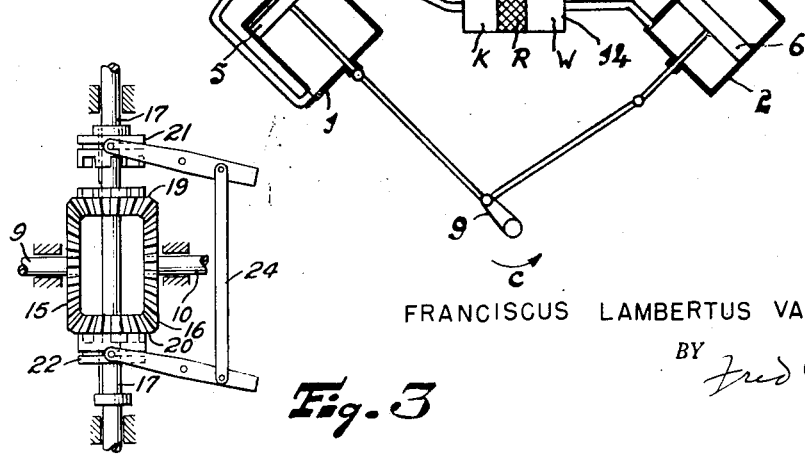
Figure 3 is a detail view on a larger scale of the transmission shown in Figure 1.

As shown in Figures 1 and 3, the crank shafts 9, 10 comprise bevel gear wheels 15 and 16, respectively, which are rigidly secured to the crank shafts 9 and 10, respectively. The main shaft 17 to be driven, to which a screw 18 is secured, comprises two loose gear wheels 19 and 20 which are adapted to co-operate with the shaft 17 alternatively by displacing the coupling means 21 and 22 by common lever 24. This permits the direction of rotation of screw 18 to be reversed without the rotation of the crank shafts of the engine being reversed.

What I claim is:

1. A double-acting hot gas engine comprising a first group of two cylinders arranged in a V, a second group of two cylinders arranged in a V and spaced from said first group, a plurality of pistons arranged one in each of said cylinders to form therewith a hot working space and cold working space on each side thereof respectively, means connecting a working space of a cylinder of each group to a working space of the second cylinder of the same group, means connecting a working space of each cylinder of one group to a working space of one cylinder of the second group, a crank shaft connected to the pistons of one group of cylinders, a second crank shaft connected to the pistons of the second group of cylinders, a shaft to be driven, and means connecting said driven shaft to both of said crank shafts.

2. A double-acting hot-gas engine comprising a first group of two cylinders arranged in a V, a second group of two cylinders arranged in a V and spaced from said first group in parallel relation thereto, a plurality of pistons arranged one in each of said cylinders to form therewith a hot working space and cold working space on each side thereof respectively, means connecting a working space of a cylinder of each group to a working space of the second cylinder of the same group, means connecting a working space of each cylinder of one group to a working space of one cylinder of the second group, a first crank shaft connected to the pistons of one group of cylinders, a second crank shaft in axial alignment with said first crank shaft and connected to the pistons of the second group of cylinders, a shaft to be driven, and gear means connecting said driven shaft to both of said crank shafts.

3. A double-acting hot gas engine comprising a first group of two cylinders arranged in a V, a second group of two cylinders arranged in a V and spaced from said first group in parallel relation thereto, a plurality of pistons arranged one in each of said cylinders to form therewith a hot working space and cold working space on each side thereof respectively, means connecting a working space of a cylinder of each group to a working space of the second cylinder of the same group, means connecting a working space of each cylinder of one group to a working space of one cylinder of the second group, a first crank shaft connected to the pistons of one group of cylinders, a second crank shaft in axial alignment with said first crank shaft and connected to the pistons of the second group of cylinders, a shaft to be driven, a gear member mounted on each of said crankshafts, two spaced gears freely mounted for rotation on the driven shaft and each engaging the gear member on each crankshaft, two spaced couplings secured to the driven shaft, means to urge one of said couplings into engagement with one of the gears mounted on the driven shaft to drive this shaft in one direction and means to urge the other of said couplings into engagement with the other of the gears mounted on the driven shaft to drive this shaft in a reverse direction.

FRANCISCUS LAMBERTUS van WEENEN.

REFERENCES CITED

The following references are of record in the file of this patent:

UNITED STATES PATENTS

| Number | Name | Date |
| --- | --- | --- |
| 571,129 | Schumacher | Nov. 10, 1896 |
| 712,329 | Pflaging | Oct. 28, 1902 |
| 2,272,925 | Smith | Feb. 10, 1942 |
| 2,468,293 | DuPre | Apr. 26, 1949 |